United States Patent Office 2,713,831
Patented July 26, 1955

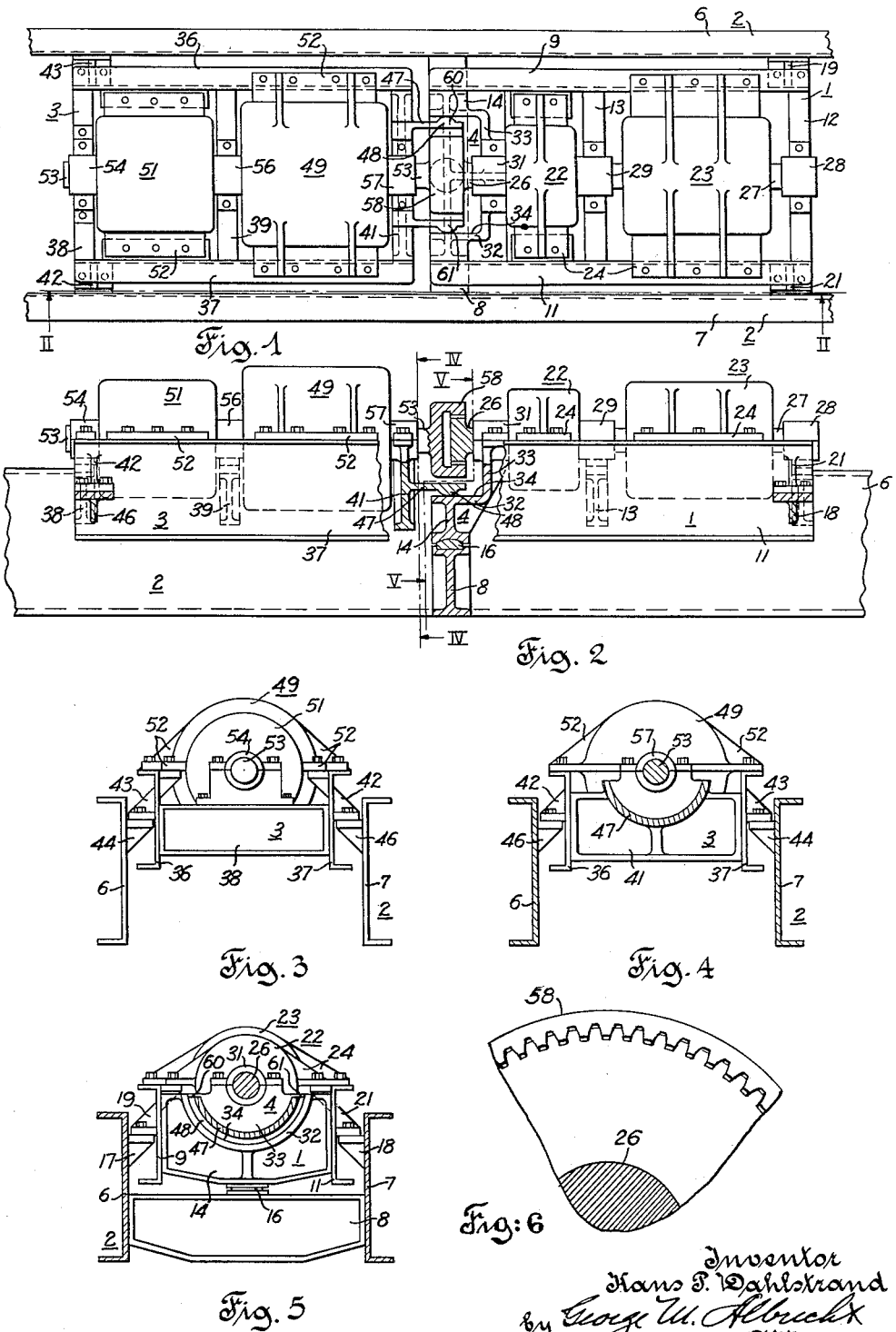

2,713,831

SUPPORT STRUCTURE FOR ROTARY MACHINES

Hans P. Dahlstrand, Wauwatosa, Wis., assignor to Allis-Chalmers Manufacturing Company, Milwaukee, Wis., a corporation of Delaware Application November 18, 1949, Serial No. 128,185

7 Claims. (Cl. 105—36)

This invention relates generally to supporting structures for rotary machine units and more specifically to supporting structures for power plants comprising a plurality of rotary units interconnected by mechanical driving connections and ducting and mounted on a foundation in such a manner that deformation of the foundation will not adversely affect the operation of the plant. It is a principal object of this invention to provide new and improved apparatus of this type.

In vehicles such as locomotives having gas turbine power plants, it is necessary to mount rotary machine units in tandem upon a common foundation frame which is subject to twisting resulting from irregularities in the road bed. If such twisting is transmitted to the rotary units, misalignment of the shafts thereof will result. It is therefore an object of this invention to provide a novel supporting structure for rotary units of this type whereby twisting of the foundation frame will be rendered harmless.

In gas turbine power plant installations where foundation deformations give rise to difficulties associated with relative movements of constituent parts of the plant, it has been proposed to mount all of the said parts in a rigid cradle having a three-point support structure coacting with the foundation frame. Such an arrangement is effective to isolate the foundation frame deformations from the power plant units but necessitates a cradle of substantial weight which is objectionable in many installations. It is therefore an object of this invention to provide a supporting structure for a gas turbine power plant which will not be subject to this objection. In accordance with this object, this invention contemplates the mounting of the power plant parts in a pair of relatively light weight cradle structures and so mounting the adjacent ends of the cradle structures as to permit limited pivotal and slidable movement of one cradle relative to the other.

Other objects will appear hereinafter as the description of the invention proceeds.

The novel features of the invention and how the objects are attained will appear more fully from this specification and the accompanying drawing showing one embodiment of the invention and forming a part of this application, and all the novel features are intended to be pointed out in the claims.

In the drawing:

Fig. 1 is a diagrammatic plan view of a portion of an installation including a plurality of rotary machines and embodying this invention;

Fig. 2 is a sectional view taken on line II—II of Fig. 1 looking in the direction of the arrows and having a central portion thereof broken away;

Fig. 3 is an end view of the installation shown in Fig. 1;

Fig. 4 is a sectional view taken on the line IV—IV of Fig. 2 looking in the direction of the arrows;

Fig. 5 is a sectional view taken on the line V—V of Fig. 2 looking in the direction of the arrows; and Fig. 6 is a partial enlarged end view of the flexible coupling indicated diagrammatically in Figs. 1 and 2.

Referring to the drawing, it will be seen that a first unit shown as rotary machine and carrying cradle structure 1 is supported on a foundation frame 2 at three points and one end of a second unit shown as rotary machine and carrying cradle structure 3 is supported by the foundation frame 2 at two points, the other end of the second cradle 3 being pivotally and slidably supported on the first cradle 1 by an articulate support structure 4.

The frame forming the foundation 2 for supporting the cradles 1 and 3 may comprise a pair of horizontally spaced parallel and longitudinally extending beam members 6, 7 connected together at an intermediate point by a cross member 8 which may be fusibly united with the beam members at their inner surfaces.

The first cradle 1 may be generally rectangular in shape and comprise two parallel side members 9, 11 and three longitudinally spaced supporting members 12, 13, 14. The midportion of the support member 14 of the cradle 1 is supported on the midportion of the cross member 8 of the foundation frame 2 by a supporting bearing member 16 and the side members 9, 11 of the cradle are supported at the ends distal the support member 14 by inwardly extending brackets 17, 18 which may be welded to the webs of the beam members 6 and 7, respectively. The supporting bearing member 16, which may be provided with spherical bearing surfaces, is constructed in such a manner as to permit relative pivotal movement between the cradle 1 and the cross member 8. The brackets 17, 18 are rigidly secured to brackets 19, 21 which in turn are rigidly secured to the side members 9, 11 at points symmetrically arranged with respect to the longitudinal axis of the cradle 1, the rigidity of the mountings preventing relative lateral and longitudinal movements between the member 12 of cradle 1 and the foundation frame 2. A plurality of rotary machines, here shown as two machines 22, 23, are arranged in tandem, operatively interconnected and supported on the two side members 9, 11 of the cradle 1 by laterally extending supporting portions 24 formed on the casings of the machines 22, 23 and rigidly secured to the side members 9, 11. The machines 22, 23 include rotary shafts 26, 27 journaled in three bearing structures 28, 29, 31 which are secured to and supported by the midportions of the supporting members 12, 13 and 14, respectively. As best shown in Figs. 2 and 5, the upper part of the midportion of the support member 14 is provided with a longitudinally extending semicylindrical element 32 having one open end adjacent the cradle 3; the other end of the element 32 is closed by a transverse plate 33 which comprises that part of the support member 14 supporting the bearing 31 as hereinbefore described. The inner surface 34 of the semi-cylindrical element 32 is coaxial with the shaft 26 of the rotary machine 22.

The second cradle 3 may also be generally rectangular in shape and comprise two parallel side members 36, 37 and three longitudinally spaced transverse members 38, 39, 41. The side members 36, 37 of the cradle 3 are supported at the ends distal the cradle 1 by outwardly extending brackets 42, 43 secured thereto. The brackets 42, 43 are in turn rigidly secured to inwardly extending brackets 44, 46 secured to the webs of the beam members 6, 7 of the foundation frame 2, the rigidity of the mountings preventing relative lateral and longitudinal movements between the transverse member 38 of cradle 3 and the foundation frame 2. As best shown in Figs. 2, 4 and 5 the end of the cradle 3 adjacent the cradle 1 is supported on the support member 14 of the cradle 1 by a semicylindrical supporting element 47 secured to the transverse member 41 of the cradle 3 in cantilever relation thereto, the supporting element 47 being substantially coaxial with the semicylindrical element 32 and disposed in telescoped relation therewith. A semiannular boss 48 having a cross section in the shape of a segment of a circle is here shown as formed on the outer peripheral wall of the supporting element 47 to pivotally and slidably engage the inner semicylindrical surface 34 of the element 32. A plurality of rotary machines, here shown as two machines 49, 51, are arranged in tandem, operatively interconnected and supported on the two side members 36, 37 of the cradle 3 by means of laterally extending supporting portions 52 formed on the casings of the machines 49, 51 and rigidly secured to the side members 36, 37. The machines 49, 51 include a rotary shaft 53 journaled in three bearing structures 54, 56, 57 which are secured to and supported by the midportions of the transverse members 38, 39 and 41, respectively.

The shaft 53 of the rotary machine 49 is connected in torque transmitting relation with the shaft 26 of the rotary machine 22 by a flexible shaft coupling 58 of any suitable type. The coupling 58 as shown diagrammatically in Fig. 2 is a well known type coupling comprising an internally splined sleeve for engaging an externally splined end portion of shaft 26 in the manner shown in Fig. 6. This type of coupling is well known for its ability to transmit torque between two shafts while permitting limited angular misalignment and limited axial movement of the shafts. The center of the flexible coupling 58 lies in a transverse vertical plane which passes through the annular boss 48 and the supporting bearing member 16, the reason for which will more fully appear.

With the frame arrangement shown, the cradles 1, 3 and the rotary machines respectively supported thereby each comprise a rigid unit which is unaffected by torsional movements of the foundation frame 2. When the foundation frame 2 is subjected to twisting about its longitudinal axis, the brackets 44, 46 and the attached cradle 3 will rotate relative to the brackets 17, 18 and the attached cradle 1, such rotation being permitted by the pivotal mounting of the one end of the cradle 3 on the cradle 1. Since the cooperating bearing surfaces of the articulate support structure 4 are coaxial with the axis of rotation of the shafts 26, 53, rotational movement of the cradle 3 relative to the cradle 1 will be about the axis of the shafts 26, 53 and will not affect alignment thereof. The three point support of the cradle 1 is of itself old in the art and the manner in which such a construction operates to prevent torsional movements of the foundation frame 2 from causing a twisting of the cradle 1 and its associated machinery should be obvious.

If the foundation frame 2 is subject to hogging and sagging, as for example in a locomotive or ship frame, the cradle 3 will swing through a vertical arc relative to the cradle 1 about a horizontal transverse axis defined by the points at which the diametrically opposite upper ends 60, 61 of the semiannular boss 48 engage the inner semicylindrical surface 34 of the element 32. It is desirable that the center of the flexible coupling 58 be disposed on or near this horizontal axis in order that longitudinal displacement of the shafts 53, 26 relative to each other as a result of such hogging and sagging will be precluded or minimized, depending on the amount of such movement, to a degree which will not impair the torque transmitting operations of the flexible coupling 58 for it will be apparent that relative swinging of the cradles 1 and 3 about a horizontal transverse axis passing through the center of the flexible coupling will result in angular misalignment of the shafts 53, 26 but not in eccentric misalignment of the ends thereof. Since the coupling 58 previously described is of a type that permits limited axial movement of the shafts 26, 53 and further since the supporting element 47 is slidably as well as pivotally supported on the first cradle 1, the adjacent ends of the first cradle 1 and second cradle 3 may move relatively toward or away from each other a limited amount for any reason such as hogging, sagging or relative expansion and contraction.

It will be understood that the supporting structure herein disclosed is susceptible of many applications where it is necessary to mount a plurality of rotary machines in tandem. Particular attention is directed to gas turbine locomotive installations where it would be advantageous to mount the multiunit power plant in two rigid groupings as hereinbefore described. In such installations the rotary machines 51 and 49 carried by the cradle 3 may comprise a compressor and a turbine, respectively, each being interconnected by ducting (not shown) and supporting auxiliaries such as a combustor (not shown). Thus the continuous combustion turbine system would be maintained as a rigid unit not subjected to the torsional movements of the foundation or locomotive frame. The rotary machines 22 and 23 carried by the cradle 1 may comprise a reduction gear and an electric generator respectively.

The side members 9, 11, 36, 37 of the cradles 1, 3 acting as beams supported at each end will have spans approximately half the span of a single prior art cradle supporting all the rotary machines and since it is well known that the approximate safe load of a beam of a given cross sectional shape varies inversely as its length and directly as its cross sectional area, it will be apparent that the shorter spans as disclosed herein will permit the use of side members having a smaller cross sectional area and accordingly provide a light weight supporting structure.

It will be apparent to those skilled in the art that the structure herein described provides a new and improved support structure for rotary machine units and accordingly accomplishes the objects of the invention. It will also be obvious to those skilled in the art that the illustrated embodiment may be variously changed and modified, or features thereof, singly or collectively, embodied in other combinations than those illustrated without departing from the spirit of the invention or sacrificing all of the advantages thereof and that accordingly the disclosure herein is illustrative only and the invention is not limited thereto.

It is claimed and desired to secure by Letters Patent:

1. In combination: two machine units each comprising a rotatable shaft journaled in a plurality of aligned bearings; flexible coupling means so interconnecting said shafts in torque transmitting relation as to cause the axes of rotation of said shafts to intersect; a foundation; first means coacting with said foundation for rigidly supporting one end of one of said units; second means coacting with said foundation for supporting the other end of said one of said units, said second supporting means comprising a structure rotatable about the axis of rotation of one of said shafts and axially movable relative to the other of said units, said second supporting means cooperating with said flexible coupling means to afford movement of said shafts and the adjacent ends of said units toward and away from each other; and third means coacting with said foundation for supporting the other of said units.

2. In combination: two machine units each comprising a rotatable shaft journaled in a plurality of aligned bearings; flexible coupling means so interconnecting said shafts in torque transmitting relation as to cause the axes of rotation of said shafts to intersect; a foundation; first means coacting with said foundation for rigidly supporting one end of one of said units; second means coacting with said foundation for supporting the other end of said one of said units, said second supporting means comprising a structure rotatable about the axis of rotation of one of said shafts and axially movable relative to the other of said units and swingable about the point of intersection of said axes of rotation of said shafts, said second supporting means cooperating with said flexible coupling means to afford movement of said shafts and the adjacent ends of said units toward and away from each other; and third means coacting with said foundation for supporting the other of said units.

3. In combination: two machine units each comprising a rotatable shaft journaled in a plurality of aligned bearings; flexible coupling means so interconnecting said shafts in torque transmitting relation as to cause the axes of rotation of said shafts to intersect; a foundation; first means coacting with said foundation for rigidly supporting one end of one of said units; second means coacting with said foundation for supporting the other end of said one of said units; said second supporting means comprising a structure rotatable about the axis of rotation of one of said shafts and axially movable relative to the other of said units and axially movable relative to said foundation, said second supporting means cooperating with said flexible coupling means to afford movement of said shafts and the adjacent ends of said units toward and away from each other; and third means coacting with said second means and said foundation for supporting the other of said units.

4. In combination: two machine units each comprising a rotatable shaft journaled in a plurality of aligned bearings, flexible coupling means so interconnecting said shafts in torque transmitting relation as to cause the axes of rotation of said shafts to intersect; a foundation; first means coacting with said foundation for rigidly supporting one end of one of said units; second means coacting with said foundation for supporting the other end of said one of said units, said second supporting means comprising a structure rotatable about the axis of rotation of one of said shafts and axially movable relative to the other of said units and axially movable relative to said foundation and swingable about the point of intersection of said axes of rotation, said second supporting means cooperating with said flexible coupling means to afford movement of said shafts and the adjacent ends of said units toward and away from each other; and third means coacting with said second means and said foundation and for supporting the other of said units.

5. In combination: two machine units each comprising a rotatable shaft journaled in a plurality of aligned bearings; flexible coupling means disposed between opposed ends of said units and so interconnecting said shafts in torque transmitting relation as to cause the axes of rotation of said shafts to intersect; a foundation; means coacting with said foundation for supporting the opposed ends of said units, said supporting means comprising a bearing member mounted on said foundation, a support member connected to the opposed end of one of said units and rotatable on said bearing member about the axis of rotation of one of said shafts, a supporting element connected to the opposed end of the other of said units and rotatable in said support member about the axis of rotation of the other of said shafts, said support member and said supporting element affording structures rotatable relative to one another and severally rotatable relative to said foundation and cooperable with said flexible coupling mens to afford movement of said shafts and the adjacent ends of said units toward and away from each other; and means coacting with said foundation for rigidly supporting the distal ends of said units.

6. In combination: two machine units each comprising a rotatable shaft journaled in a plurality of aligned bearings; flexible coupling means disposed between opposed ends of said units and so interconnecting said shafts in torque transmitting relation as to cause the axes of rotation of said shafts to intersect; a foundation; means coacting with said foundation for supporting the opposed ends of said units, said supporting means comprising a bearing member mounted on said foundation, a support member connected to the opposed end of one of said units and rotatable on said bearing member about the axis of rotation of one of said shafts, a supporting element connected to the opposed end of the other of said units and slidable in said support member for rotation about the axis of rotation of the other of said shafts and for axial movement relative to said one of said units, said support member and said supporting element affording structures rotatable and axially movable relative to one another and severally rotatable relative to said foundation and cooperable with said flexible coupling means to afford movement of said shafts and the adjacent ends of said units toward and away from each other; and means coacting with said foundation for rigidly supporting the distal ends of said units.

7. In combination: two machine units each comprising a rotatable shaft journaled in a plurality of aligned bearings; flexible coupling means disposed between opposed ends of said units and so interconnecting said shafts in torque transmitting relation as to cause the axes of rotation of said shafts to intersect; a foundation; means coacting with said foundation for supporting the opposed ends of said units, said supporting means comprising a bearing member mounted on said foundation, a support member connected to the opposed end of one of said units and rotatable on said bearing member about the axis of rotation of one of said shafts, a supporting element connected to the opposed end of the other of said units and slidable in said support member for rotation about the axis of rotation of the other of said shafts and for axial movement relative to said one of said units, said supporting element being further swingable about the point of intersection of the axes of rotation of said shafts relative to said first journal member to afford relative angling of said units, said support member and said supporting element affording structures rotatable and axially movable and swingable relative to one another and severally rotatable relative to said foundation and cooperable with said flexible coupling means to afford movement of said shafts and the adjacent ends of said units toward and away from each other; and means coacting with said foundation for rigidly supporting the distal ends of said units.

References Cited in the file of this patent
UNITED STATES PATENTS

| | | |
|---|---|---|
| 1,876,312 | Morck | Sept. 6, 1932 |
| 2,231,260 | Endsley | Feb. 11, 1941 |
| 2,298,309 | Ray | Oct. 13, 1942 |
| 2,412,848 | Warren | Dec. 17, 1946 |